United States Patent
Camberlin et al.

(10) Patent No.: US 6,184,303 B1
(45) Date of Patent: Feb. 6, 2001

(54) POLYMER CONTAINING A SUCCINIMIDE RING SUBSTITUTED ON THE NITROGEN ATOM BY A REACTIVE GROUP

(75) Inventors: Yves Camberlin, Caluire; Serge Gonzalez, Decines; Frédérique Hauviller, Saint Genis Laval, all of (FR)

(73) Assignee: Institut Francais du Petrole, Rueil Malmaison (FR)

( * ) Notice: Under 35 U.S.C. 154(b), the term of this patent shall be extended for 0 days.

(21) Appl. No.: 08/988,988

(22) Filed: Dec. 11, 1997

(30) Foreign Application Priority Data

Dec. 12, 1996 (FR) .................................................. 96 15471

(51) Int. Cl.⁷ ....................................................... C08F 8/32
(52) U.S. Cl. ........................ 525/282; 525/327.6; 525/379
(58) Field of Search ............................................... 525/282

(56) References Cited

U.S. PATENT DOCUMENTS

| | | | |
|---|---|---|---|
| 4,113,694 | 9/1978 | Arrighetti et al. | 260/875 |
| 4,632,962 | * 12/1986 | Gallucci | 525/282 |
| 4,962,149 | 10/1990 | Fry et al. | 524/555 |
| 4,966,947 | * 10/1990 | Fry et al. | 525/282 |
| 5,466,753 | 11/1995 | Marczinke et al. | 525/193 |

FOREIGN PATENT DOCUMENTS

| | | |
|---|---|---|
| 43 32 734 | 3/1995 | (DE) . |
| 43 33 670 | 4/1995 | (DE) . |
| 0 379 942 | 8/1990 | (EP) . |

* cited by examiner

*Primary Examiner*—Bernard Lipman
(74) *Attorney, Agent, or Firm*—Millen White Zelano & Branigan

(57) ABSTRACT

A polymer contains a succinimide ring substituted on the nitrogen atom by a reactive group, where the ring is supported either by the main chain or by a side chain, the polymer resulting from reacting at least one polyolefin with at least one compound containing a maleimide ring substituted on the nitrogen atom by a reactive group with formula —R—(X)$_n$ where X is a reactive group, n is a whole positive number equal to 1 or more and R is a residue containing at least one carbon atom.

These polymers can be used for the production of co-extruded products, multi-layered materials, surface coatings and polymer alloys.

3 Claims, No Drawings

POLYMER CONTAINING A SUCCINIMIDE RING SUBSTITUTED ON THE NITROGEN ATOM BY A REACTIVE GROUP

The present invention concerns polymers containing at least one succinimide ring substituted on the nitrogen atom by a reactive group, where the ring is supported either by the main chain or by a side chain.

The properties of the polymers of the present invention are improved compared with polymers which do not contain a succinimide ring substituted on the nitrogen atom by a reactive group. In particular, they have improved adhesive properties and can thus be used as surface coatings. They are also more heat resistant than the polymers from which they are derived.

The polymers of the present invention have reactive groups which allow them to be used in the production of polymer alloys.

The polymers of the present invention can be defined as polymers containing at least one succinimide ring substituted on the nitrogen atom by a reactive group, the ring being supported either by the main chain or by a side chain, the polymers resulting from reacting at least one polyolefin obtained from at least one unsaturated monomer selected from ethylene, butenes and norbornenes, with at least one compound containing a maleimide ring substituted on the nitrogen atom by a reactive group with formula —R—(X)$_n$ where X is a reactive group, n is a number equal to 1 or more and R is a residue containing at least one carbon atom. Usually, n equals 1 and in this case the compound containing a maleimide ring used in the present invention is represented by formula 1 below:

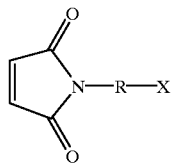

FORMULA I

The reactive group —X is generally selected from a hydroxyl group, a carboxylic group, a carboxamide group, a carboxylic acid halide group, a thiol group, a thiocarboxylic group, an amino group, a halogen, an epoxy group, and an esterified carboxylic group in which the ester portion contains a reactive group. When a plurality of —X groups are present, they can be identical or different.

Very often, the reactive group is selected from groups which can react with epoxy functions by opening the oxirane ring. Usually, compounds containing a reactive group are used which are selected from a carboxylic group, a carboxamide group and an acid halide group, for example a carboxylic acid chloride group. The preferred group is the carboxylic group.

The group —R— is normally selected from the group formed by saturated or unsaturated, substituted or unsubstituted aliphatic hydrocarbons, and substituted or unsubstituted aromatic groups. In general, unsubstituted groups are preferred, normally groups containing at least one aromatic nucleus. Examples of groups which are frequently used are benzenic groups which are bonded in the ortho, meta or para position to the nitrogen atom and to the reactive group —X. Normally, the para or meta form is used.

The polyolefins used to produce the polymers of the present invention can be formed by homopolymerisation or copolymerisation of at least two monomers.

In one particularly preferred form, the polyolefin is selected from the group formed by high density polyethylenes and ethylene copolymers which are preferably constituted by at least 90% of ethylene moieties and at most 10% of a $C_3$ to $C_8$ olefin. More particularly, high density polyolefins are used which preferably have a density of about 0.9 to about 0.97 and a fusion index measured in accordance with standard ASTM D-1238 of about 0.2 to about 100 (measurements carried out under a 19.6 kg load at 190° C.).

The polymers of the present invention are prepared bringing a molten polyolefin into contact with at least one compound containing a maleimide ring substituted on the nitrogen atom by a reactive group in a mixer or extruder. This preparation can be carried out with or without a radical initiator. Examples of radical initiators are peroxides. Preferably, a radical initiator is not used in the present invention. This possibility of forming, without a radical initiator, polymers containing a succinimide ring substituted on the nitrogen atom by a reactive group, the ring being supported either by the principal chain or by a side chain, constitutes a distinct advantage of the present invention which avoids the risk of cleavage and cross-linking of the polymer. The reaction temperature is normally in the range from about the fusion temperature of the polyolefin to about 300° C. This temperature is usually about 200° C. to about 260° C. The reaction time is relatively short and normally does not exceed 10 minutes. An extrusion-reaction system is normally preferable as it produces very good results.

The present invention also concerns the use of the polymers described above for the production of surface coatings. These polymers, with good adhesive properties, are more suitable than the starting polyolefins for this application. These polymers can also be used to produce alloys of polymers, in which the reactive function improves formation of the alloys. They can also be used for the production of co-extruded products. They can also be used for the production of multi-layered materials.

The following examples illustrate the invention without limiting its scope.

EXAMPLE 1

This example describes the preparation of a grafted polymer in a mixer. 42.5 grams (g) of medium density polyethylene (d=0.954) sold by FINA under the trade name Finathene 3802® and 0.42 g of 4-maleimidobenzoic acid (AMB) were introduced into a Haake Rheocord® kneader. The working temperature was 240° C., the blade rotation rate was 64 revolutions per minute (rpm). After 5 minutes of mixing at 240° C., the reaction product was cooled in water and dried at 60° C. under 1 millimetre (mm) of mercury for 8 hours. The product obtained was used for adhesion tests, the results of which are shown in Table 1 below.

EXAMPLE 2

The procedure described in Example 1 was repeated, using 1.7 g of AMB, i.e., 2.5% by weight. The product obtained was used in adhesion tests, the results of which are shown in Table 1 below.

EXAMPLE 3

This example describes the preparation of a grafted polymer using a CLEXTRAL co-rotating twin screw extruder sold under the trade name BC21, with a length/diameter ratio of 28, a screw diameter of 25 mm and provided with a 4 mm diameter die.

Granules of Finathene 3802® polyethylene and a quantity corresponding to 1% by weight of AMB with respect to the polyethylene were simultaneously introduced into the supply hopper of the extruder.

The total rate at which the products were introduced into the extruder was 5 kilograms per hour and the reaction temperature in the extruder was held at 240° C. The screw rotation speed was 100 rpm, the residence time was 1 minute. The rod leaving the die was cooled in water at 25° C., granulated and dried for the adhesion tests.

EXAMPLE 4

The procedure described in Example 3 was repeated, using 2% by weight of AMB. The product obtained was used in adhesion tests, the results of which are shown in Table 1 below.

EXAMPLE 5

Adhesion tests were carried out on the various products using metallic aluminium specimens.

The adhesive properties of the compositions were determined using the ASTM D 1002 method.

The test procedure comprised preparing metallic specimens. 600 cm$^3$ of chromic-sulphuric acid mixture was prepared and a series of specimens was placed on a support then immersed in a receptacle containing the chromic-sulphuric acid mixture which was held at a temperature of 60° C. After 15 minutes, the samples were withdrawn. They were rinsed with plenty of water and oven dried for 2 hours at 80° C.

An adhesive bonding surface 25.4 mm×12.7 mm was delimited on a specimen and a maximum adhesive joint thickness of 125×10$^{-6}$ m was delimited using shims. Two specimens were adhesively bonded using a DARRAGON table press preheated to 200° C., applying a pressure of 0.5 MPa for 5 minutes.

A traction test was then carried out with an INSTRON type machine provided with a measuring head of 10$^5$ Newton. The rate of displacement of the beam was 1 mm/min.

The results of the adhesion tests are given in Table 1 below. The values given correspond to an average value obtained over 10 successive tests. By way of comparison, tests were carried out on medium density polyethylene HDPE Finathene 3802® and with a terpolymer sold by ORKEM with reference Lotader 3210® with a number average molecular mass of 15050 and a polydispersity index of 5.3.

TABLE 1

| Nature of tested polymer | Breaking load in kiloNewton (kN) | Nature of break |
|---|---|---|
| HDPE | 2.1 | adhesive |
| Lotader 3210 ® | 2.7 | adhesive |
| Product from example 1 | 4.2 | cohesive |
| Product from example 2 | 3.9 | cohesive |

TABLE 1-continued

| Nature of tested polymer | Breaking load in kiloNewton (kN) | Nature of break |
|---|---|---|
| Product from example 3 | 4.3 | cohesive |
| Product from example 4 | 4.0 | cohesive |

The large increase in the maximum load necessary to cause breaking when using the products of the present invention can be seen, also the difference in the nature of the break which occurs in the mass and which demonstrates the large improvement in adhesion obtained with the products of the invention.

What is claimed is:

1. A polymer containing at least one succinimide ring substituted on the nitrogen atom by a reactive group, said ring being supported either by the main chain or by a side chain, said polymer being a reaction product resulting from reacting a polyolefin selected from the group consisting of a homopolymer of ethylene, a copolymer of ethylene constituted by at least 90% by weight of ethylene moieties and at most 10% by weight of a $C_3$ to $C_8$ olefin, and a polymer of a norbornene, with at least one compound containing a maleimide ring substituted on the nitrogen atom by a reactive group with formula —R—(X)$_n$ where X is a carboxylic group, n is a number equal to 1 or more and R is a residue containing at least one carbon atom.

2. A polymer consisting essentially of at least one succinimide ring substituted on the nitrogen atom by a reactive group, said ring being supported either by the main chain or by a side chain, said polymer being a reaction product resulting from reacting a polyolefin selected from the group consisting of a homopolymer of ethylene, a copolymer of ethylene constituted by at least 90% by weight of ethylene moieties and at most 10% by weight of a $C_3$ to $C_8$ olefin, and a polymer of a norbomene, with at leant one compound containing a maleimide ring substituted on the nitrogen atom by a reactive group with formula —R—(X)$_n$ where X is a carboxylic group, n is a number equal to 1 or more and R is a residue containing at least one carbon atom.

3. A polymer consisting of at least one succinimide ring substituted on the nitrogen atom by a reactive group, said ring being supported either by the main chain or by a side chain, said polymer being a reaction product resulting from reacting a polyclefin selected from the group consisting of a homopolymer of ethylene, a copolymer of ethylene constituted by at least 90% by weight of ethylene moieties and at most 10% by weight of a $C_3$ to $C_8$ olefin, and a polymer of a norbornene, with at least one compound containing a maleimide ring substituted on the nitrogen atom by a reactive group with formula —R—(X)$_n$ where X is a carboxamide group, n is a number equal to 1 or more and R is a residue containing at least one carbon atom.

* * * * *

UNITED STATES PATENT AND TRADEMARK OFFICE
CERTIFICATE OF CORRECTION

PATENT NO.   : 6,184,303 B1
DATED        : February 6, 2001
INVENTOR(S)  : Camberlin et al.

It is certified that error appears in the above-identified patent and that said Letters Patent is hereby corrected as shown below:

Column 4,
Line 38, delete "norbomene", and insert -- norbornene --;
Line 38, delete "leant," and insert -- least --;
Line 47, delete "polyclefin," and insert -- polyoefin --;
Lines 53-54, delete "carboxamide," and insert -- carboxylic --.

Signed and Sealed this

Twenty-third Day of April, 2002

*Attest:*

*Attesting Officer*

JAMES E. ROGAN
*Director of the United States Patent and Trademark Office*